UNITED STATES PATENT OFFICE.

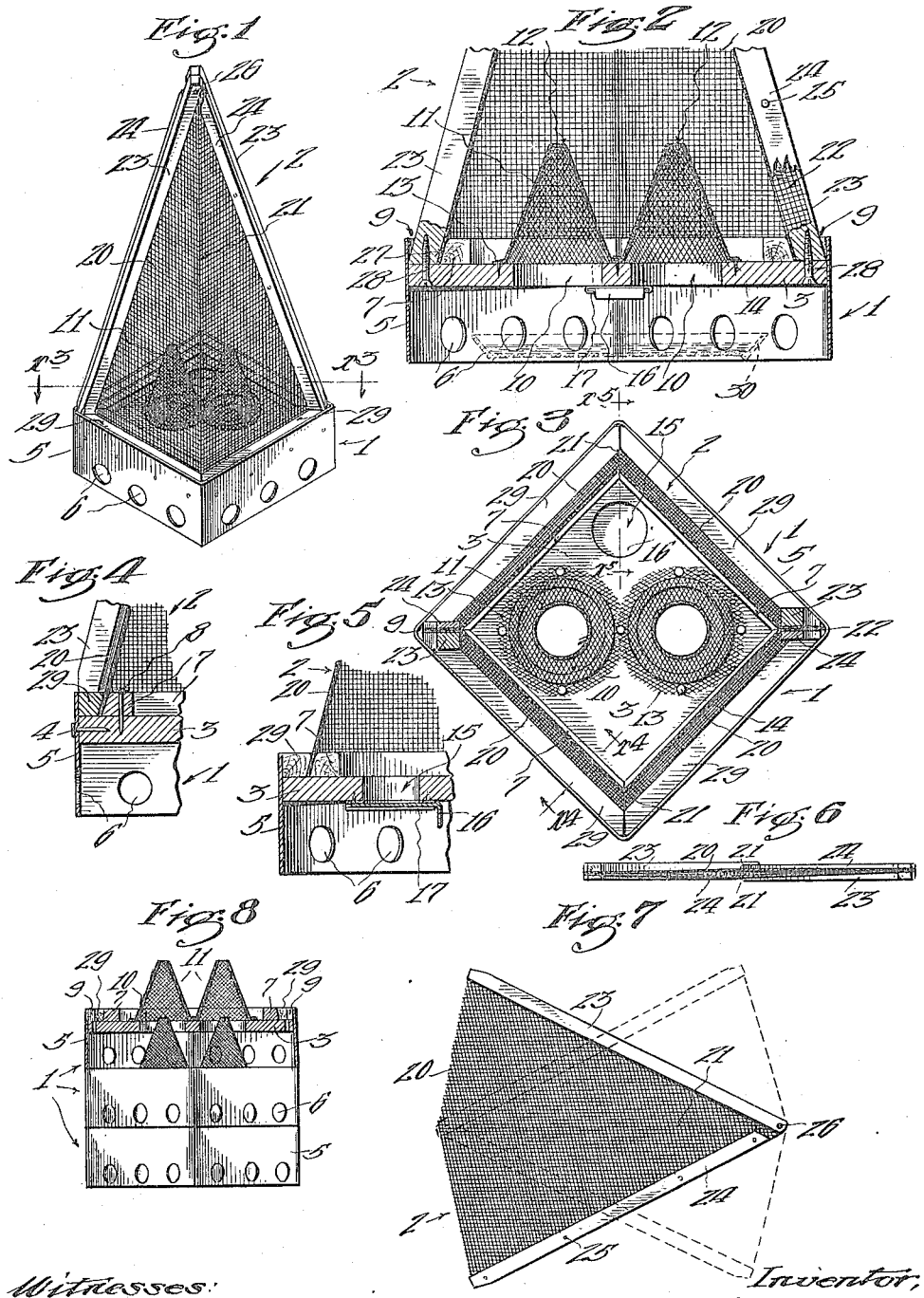

ALONZO E. CHAPMAN, OF REDLANDS, CALIFORNIA.

KNOCKDOWN FLY-TRAP.

1,136,210.

Specification of Letters Patent.

Patented Apr. 20, 1915.

Application filed December, 11, 1913. Serial No. 805,944.

*To all whom it may concern:*

Be it known that I, ALONZO E. CHAPMAN, a citizen of the United States, residing at Redlands, in the county of San Bernardino and State of California, have invented a new and useful Knockdown Fly-Trap, of which the following is a specification.

My invention relates to fly traps, being more particularly of the type of fly trap which is placed out of doors adjacent buildings, the trap having capacity to hold a large quantity of flies. It is particularly desirable for the manufacturer to have a fly trap of the character described of such construction that a great number of such traps may be shipped in small bulk and one of the main objects of my invention is to produce a fly trap which may be quickly and easily partly disassembled for shipping purposes, and in attaining such object provide simple fastening means for securing the parts so disassembled.

In using traps which are placed out of doors very frequently the traps are accidentally knocked over and in some cases the same are blown over by the wind, and another object of my invention is to provide a fly trap of the character described which has a comparatively heavy base together with a top or trap member which presents a gradually lessening surface to wind pressure from the base member to the top thereof.

Referring to the drawings, which are for illustrative purposes: Figure 1 is a perspective view of a fly trap embodying my invention. Fig. 2 is an enlarged cross sectional view of the lower portion of the trap shown in Fig. 1. Fig. 3 is an enlarged sectional plan view on line $x^3$—$x^3$ Fig. 1. Fig. 4 is a fragmentary sectional view showing the filling blocks and adjacent parts thereto. Fig. 5 is a fragmentary sectional view showing the discharge gate of the trap and manner of mounting same. Fig. 6 is an end view of the cage member in flattened position ready for shipping. Fig. 7 is a plan view of the cage member in flattened position. Fig. 8 is a view of several base members of the trap as placed for shipping.

My fly trap comprises a base member 1, and a cage member 2, the base member 1 being substantially square in plan and the cage member 2 forming substantially a pyramid of screen material, the base of which is secured to the top of the base member 1.

The base member 1 consists of a horizontal wooden floor 3 secured by means of nails or screws 4 within a support 5 consisting of a sheet metal band which surrounds the floor 3. The upper edge of the band 5 extends a short distance above the floor 3 and the lower edge of the band 5 is adapted to rest on the ground or pavement, not shown, the band 5 extending below the floor 3 a sufficient distance to support the floor 3 several inches above the ground and to permit a series of holes or openings 6 to be placed in the band below the floor 3.

7 designates four strips of wood secured to the upper face of the floor 3 by means of nails 8 to form a flange spaced apart from the upper edge of the band 5 and forming a recess 9 therebetween adapted to receive the lower end of the cage member as hereinafter described. In the form shown two circular entrance openings 10 are formed in the floor 3 of the trap over each of which is placed a cone 11 of screen having a small opening 12 at the top thereof and having the lower edge thereof bent outwardly in the form of a circular flange 13 by means of which the respective cones 11 are secured to the face of the floor 3 by means of nails 14. A discharge opening 15 is provided in the floor 3 for emptying the trap which is closed by means of a sliding gate 16 slidably mounted in guides 17 secured in any suitable manner to the underside of the floor 3 at each side of the opening 15.

The cage member 2 comprises a pyramid of screen open at the bottom and having its sides formed of two pieces of screen 20, each of which is creased or bent as indicated at 21 to form one edge of the pyramid. The vertically extending adjacent edges 22 of each screen 20 are clamped respectively to the posts 23 of the cage member by means of strips of wood 24 which are secured to the posts 23 by means of nails 25. The posts constitute a frame for the screen portion of the cage member, the upper end of the posts overlapping each other and being pivotally connected at such point by means of a pin or screw 26. The lower ends of the screen members 20 extend into the recess 9 and fit against the outer face 27 of the wooden strips 7, the face of the strips 7 being beveled to correspond to the angle of the screens 20. When the screens 20 are so placed the lower ends of the respective posts 23 rest upon the floor 3 with the recess 9, and the cage member is secured to the base member 1 by means of two screws 28 which extend upwardly through the floor 3 into the respective lower ends of the posts 23. For the purpose of holding the lower ends of the screen members 20 against the strips 7 filler blocks 29 are employed which are placed in the recess 9 between the screens and the upper end of the band 5, thereby forming a tight closure between the cage member 2 and the base member 1.

The trap above described operates as follows: Bait is placed in a saucer or pan indicated at 30 in dotted lines, see Fig. 2, under the floor 3 of the trap, and the flies enter the trap through the openings 6 in the base. After feeding, the flies travel toward the most light which enters the base member through the openings 10 in the floor 3. The flies alight on the inner side of the cones 11 and pass upwardly into the cage member 2 through the openings 12 in the top of the cones. There being no outlet from the cage member 2 except through the openings 2 in the cones 11 the flies starve to death and fall to the floor of the trap, it being understood that flies rarely travel downwardly through small openings such as the openings 12 in the top of the cones 11. After a number of dead flies accumulate in the trap they may be removed by opening the door 16.

When it is desired to ship a number of traps the cage members 2 of the respective traps are removed from their respective base members, by removing the screws 28 after which the base members may be placed in a compact package one above another as indicated in Fig. 8. The cage members are then each flattened out as shown in Figs. 6 and 7, by spreading the lower ends of the posts 23, and placed one above another as shown in dotted lines in Fig. 7, the upper or apex end of one cage member being placed on the bottom end of the cage member thereunder. It is to be noted that the bent edge 21 of the screens 20 is not deformed by spreading the posts 23 to the position shown in Figs. 6 and 7 and when it is desired to set up the traps the lower ends of the posts 23 are moved toward each other until the screens 20 form a pyramid after which the cage member may be fastened to its respective base member as heretofore described.

What I claim is:

1. A knock-down fly trap comprising a detachable base member having entrance means therein and a cage member comprising two flat pieces of screen with a pair of hinged posts secured to the edges thereof.

2. A knock-down fly trap comprising a square detachable base member having entrance openings therein, and a cage member formed of a pyramid of wire cloth with two hinged posts secured to opposite corners thereof.

3. A knock-down fly trap comprising a square detachable base member having entrance openings therein, and a detachable cage member formed of two flat pieces of wire cloth bent in pyramid form and having posts at the two opposite corners thereof, said posts being hinged together by means of a bolt at the apex of the pyramid.

4. A knock-down fly trap comprising a square detachable base member having entrance openings therein, a cage member formed of two flat pieces of screen bent into pyramid form, posts secured at opposite corners of said pyramid, said posts being hinged together by means of a bolt at the apex of the pyramid and means for detachably securing said cage and said posts to said base.

5. A knock-down fly trap comprising a flat base having entrance means therein, and a cage member detachably secured to said base and adapted to be folded flat when not in use.

6. A knock-down fly trap comprising a flat base having a projecting ledge formed on the upper surface thereof, a detachable and folding cage member adapted to fit closely against said base and to extend over said ledge, and filler members adapted to be detachably secured outside said cage member and adjacent to said ledge.

7. A knock-down fly trap comprising a flat base having a ledge formed on the upper surface thereof, a thin band secured to the edge of said base and projecting above the top of said base, a detachable and folding cage member adapted to fit closely against said base outside said ledge, and filler blocks adapted to fit between said band and said ledge outside the cage member.

In testimony whereof, I have hereunto set my hand at Redlands, California, this 5th day of December, 1913.

ALONZO E. CHAPMAN.

In presence of—
  C. P. HOOK,
  L. H. JONES.